United States Patent

Shahamat et al.

[11] Patent Number: 5,323,080
[45] Date of Patent: Jun. 21, 1994

[54] ONE-PIECE ROTOR SHAFT FOR TWO-POLE ROTOR

[75] Inventors: Mohammad Shahamat, Stow, Ohio; Walter Iseman, Monroe Center, Ill.; Tyrone A. Johnsen; Roy D. Rasmussen, both of Rockford, Ill.

[73] Assignee: Sundstrand Corporation, Rockford, Ill.

[21] Appl. No.: 59,034

[22] Filed: May 7, 1993

[51] Int. Cl.⁵ .............................. H02K 1/22
[52] U.S. Cl. ...................... 310/261; 310/91; 310/180; 310/216
[58] Field of Search ............... 310/261, 216, 262, 263, 310/264, 265, 179, 180, 42, 194, 91, 214; 29/598

[56] References Cited

U.S. PATENT DOCUMENTS

| 1,273,385 | 7/1918 | Ljungstrom | 310/262 |
| 2,735,030 | 2/1956 | Brainard | 310/261 |
| 4,024,628 | 5/1977 | Crites | 310/262 |
| 4,139,789 | 2/1979 | Hunt | 310/40 |
| 4,510,679 | 4/1985 | Aleem et al. | |
| 4,513,218 | 4/1985 | Hansen | |
| 4,562,641 | 1/1986 | Mosher et al. | |
| 4,591,749 | 5/1986 | Gauthier | 310/43 |
| 4,598,218 | 7/1986 | Aleem et al. | |
| 4,614,888 | 9/1986 | Mosher et al. | |
| 4,625,135 | 11/1986 | Kasabian | 310/42 |
| 4,631,435 | 12/1986 | McCarty | 310/156 |
| 4,674,178 | 6/1987 | Patel | 310/43 |
| 4,757,603 | 7/1988 | Stokes | 310/43 |
| 4,933,583 | 6/1990 | Ripplinger | 310/156 |
| 5,122,704 | 6/1992 | Blakeley et al. | 310/262 |

Primary Examiner—R. Skudy
Attorney, Agent, or Firm—Jeffery J. Makeever

[57] ABSTRACT

A two-pole generator rotor assembly including a one-piece shaft, a prewound field coil assembly and a one-piece shaft. The one piece shaft includes a pair of axially spaced shaft end portions and a substantially cylindrical portion integrally formed with the spaced shaft end portions and interposed therebetween. The substantially cylindrical central portion includes a through slot for accommodating the prewound field coil assembly, with the through slot including a pair of opposed wall portions adapted to engage an outer peripheral portion of the prewound field coil assembly and provide means for retention of the prewound field coil.

19 Claims, 3 Drawing Sheets

ONE-PIECE ROTOR SHAFT FOR TWO-POLE ROTOR

FIELD OF THE INVENTION

The present invention relates to a generator rotor and, more particularly, to a two-pole generator rotor used, for example, in integrated drive generators (IDGs), auxiliary- power unit generators (APU GENs) and other similar type electrical generators for aircraft.

CROSS-REFERENCE TO RELATED APPLICATIONS

In commonly assigned United States application Ser. No. 08/058,694, entitled "Rotor Shaft With Integral Wedge Retainers for Core of A Two Pole Generator", Robert L. Capion and Lee L. Thomas filed on even date herewith, an effective technical approach is provided utilizing a bipartite shaft having field coil assembly wedge portions respectively integrally formed with the shaft end portions, and with an oil containment canister in the form of a sleeve member of high strength material surrounding the assembled shaft unit.

BACKGROUND ART

Generators as utilized in IDGs, APU GENs, and other similar type electrical generators for aircraft are termed "electromechanical" devices because they convert mechanical energy from the appropriate power source to electrical energy. This energy is then utilized throughout the aircraft to light lights, cook food, and power complex systems such as pilot instrumentation, radar, communications, flight computers, etc. The conversion is accomplished as the rotational mechanical energy of the engine, for example, transmits a torque to the generator rotor, through appropriate gearing, causing this rotor to spin.

This two-pole rotor has wires wound around a field pole piece making up what is termed the field coil assembly. When an electric current is passed through this rotating field coil assembly, or more specifically through the wires wound on the field pole piece, a rotating magnetic field results. This rotating magnetic field or flux, in turn, induces a field in the structure of the generator surrounding the rotor assembly known as the stator which also has wires wound around its assembly. Connections to the windings of this stator are then made to allow the electric power to be delivered to the various loads of the aircraft.

Generally, the two-pole rotor utilized in this type of generator is composed of a plurality of precision fitted parts which are bolted or welded together. While this technical approach is functionally satisfactory, a disadvantage resides in the fact that the total costs involved in producing this rotor as a result of the required precision fitting of the components as well as the necessary welding, pinning and bolting operations, is relatively high. Further, if this precision fitted unit is to be repaired, a lengthy and expensive process requiring first that the welds be cut prior to any actual repair activity beginning must be undertaken.

Conventionally, wedge portions are provided as part of the rotor assembly. These wedges are generally hollowed out or configured to the coil profile which is somewhat rounded to accommodate the large number of windings in the field coil assembly required to generate the necessary magnetic field described above. To allow for the transmission of the large torques generated by the aircraft engine in this connection, high strength axial retention bolts are utilized to bolt the shaft ends to the field pole piece. High strength radial retention bolts are utilized in turn to retain the separate field core accommodating wedges to the field pole pieces under the tremendous centrifical forces generated by the speed at which this rotor assembly spins, typically in excess of 20,000 RPM.

To aid the torque transmission capability required to allow this assembly to spin at such a high speed, an oil accommodating canister surrounding the field coil is typically welded to the ends of the shaft after assembly and then finish ground to size. A disadvantage of this approach resides in the fact that the completed unit is, at best, difficult if not impossible to repair or service and, taking into account the manufacturing steps and processes, the unit is difficult and expensive to construct.

Specifically, with regard to service and repair, the welding of the oil accommodating canister to the ends of the shaft renders the conventional two-pole rotors more or less disposable. This is because the expensive and time consuming task of cutting these welds must first be accomplished to gain access to the core assembly which is encased by the oil accommodating canister before any service or repair may begin.

If this lengthy and expensive procedure is undertaken, and the unit is repaired, additional work is usually required to regrind the grooves, known as bearing races, which allow the unit to rotate on its bearings, as they are typically out of concentricity when the unit is reassembled.

Typical examples of rotor constructions of the aforementioned type are disclosed in, for example, U.S. Pat. Nos. 4,510,679, 4,513,641, 4,562,641, 4,591,749, 4,757,603, 4,674,178, 4,625,135, 4,598,218, and 4,614,888. While each of these patents provide various approaches for constructions of a rotor, each technical approach utilizes a multi-piece shaft construction and, consequently, suffers from the above-noted disadvantages.

SUMMARY OF THE INVENTION

It is, therefore, a primary objective of the present invention to provide an improved generator rotor. More specifically, a two-pole generator rotor which avoids, by simple means, shortcomings and disadvantages encountered in the prior art and which is simple and inexpensive to manufacture, maintain, and repair.

In accordance with advantageous features of the present invention a two pole generator rotor assembly is provided including a prewound field coil assembly and a shaft means, with the shaft means including a pair of spaced shaft end portions and a substantially cylindrical portion integrally formed with the spaced shaft end portions interposed therebetween so as to form a one-piece shaft. The substantially cylindrical central portion includes a through slot means for accommodating the prewound field coil assembly. The through slot means includes a pair of opposed wall portions adapted to engage an outer peripheral portion of the prewound field coil assembly and form wedge portions.

The above and other objects, features, and advantages of the present invention will become more apparent from the following description when taken in connection with the accompanying drawings which show, for the purpose of illustration only, specific embodiments in accordance with the present invention.

DESCRIPTION OF THE PREFERRED EMBODIMENTS

Figure 1:
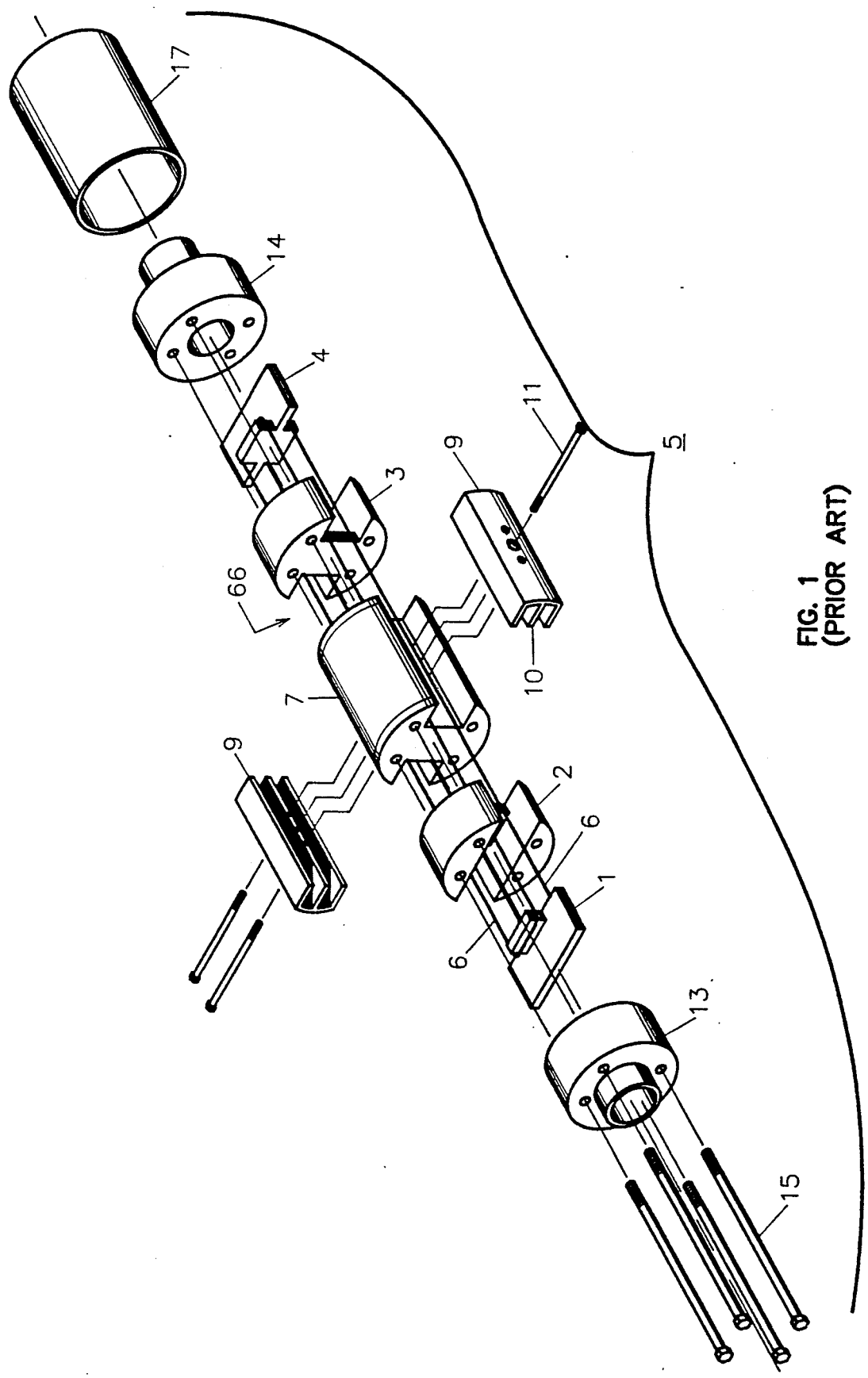
FIG. 1 is an exploded perspective view of a conventional rotor assembly.

Referring now to the drawings wherein like reference numerals are used throughout the various views to designate like parts and, more particularly, to FIG. 1, a conventional shaft assembly 5 for a two-pole generator rotor includes a field coil assembly 66 comprised of a core 7, end supports 2, 3, spacers 1,4, and a field coil 6 to which is attached separate coil retaining wedges 9 having an internal profile corresponding to an external profile of the field coil 6. High strength radial retention bolts 11 are provided for securing the wedges 9 together into the subassembly of the wedges 9 and field core 7. That assembly is then secured to the shaft end portions 13, 14 by high strength axial retention bolts 15. This conventional shaft assembly 5 is then inserted into an oil containment can 17 which is then welded to shaft end portions 13, 14 of the conventional shaft assembly 5.

Figure 2:
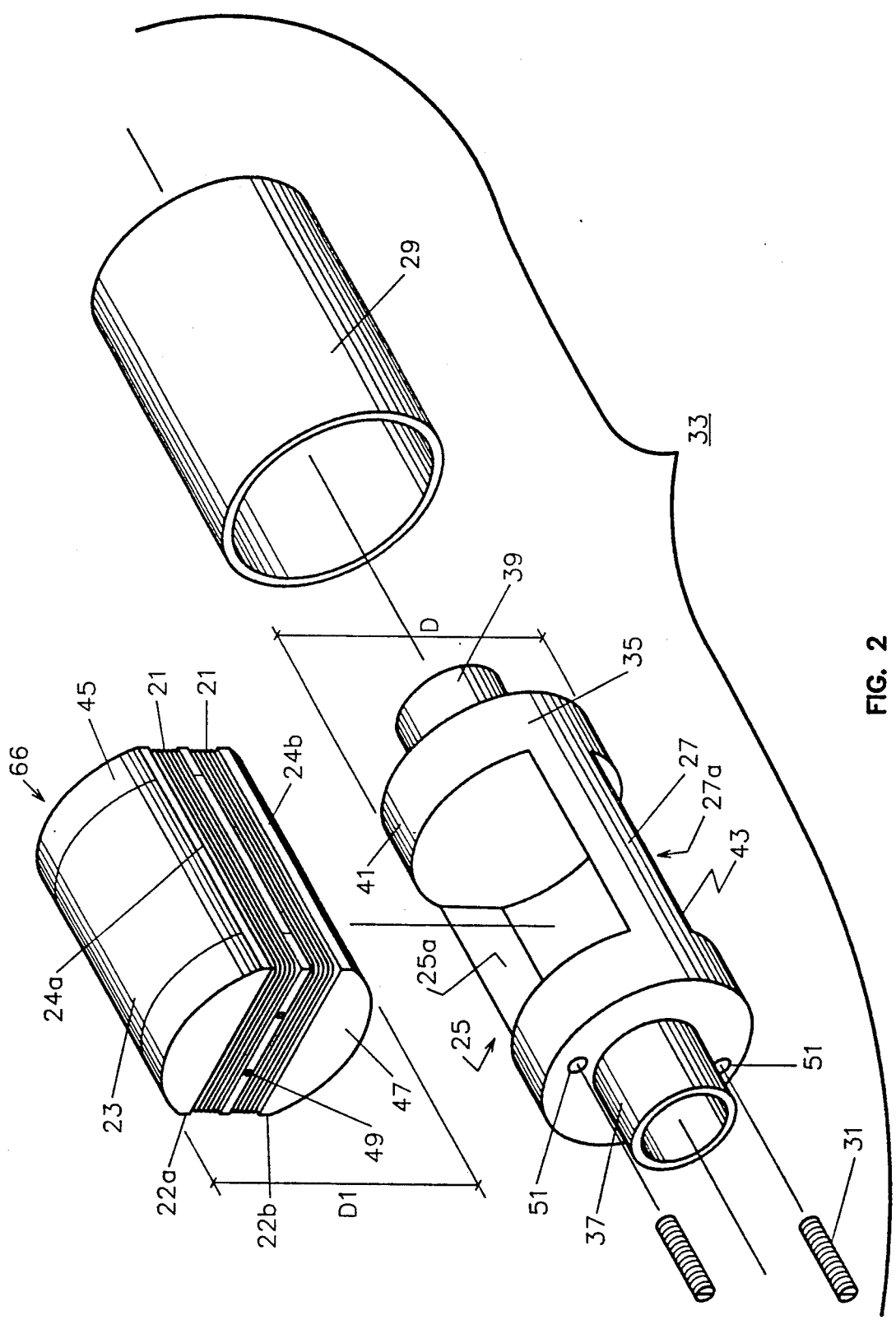
FIG. 2 is an exploded perspective view of the one piece two-pole generator shaft in accordance with the present invention.

As shown in FIG. 2, in accordance with the present invention, a two pole rotor assembly 33 is formed by radially inserting a field coil assembly 66 consisting of a core 23 having flat surfaces 22a, 22b, 24a, 24b, end supports 45, 47 and coil 21 into an opening 43 in a one-piece shaft 35 and by axially sliding a containment sleeve member 29 over them. The flat surfaces 22a, 22b of core 23 abut against flat surface 25a of the shaft 35 and similarly, flat surfaces 24a, 24b of core 23 abut against the flat surface 27a of the shaft 35. The sleeve member 29, in conjunction with the one-piece shaft 35, defines an oil containment can. While the illustrated embodiment proposes the use of axially directed restraining means, such as threaded member 31, it is understood that the axial directed threaded member 31 may be eliminated with the necessary axial positioning of the field coil 21 and core 23 in the assembly being alternatively accomplished by either radially directed fastening means, such as threaded 53, as shown FIG. 3, or by the mounted sleeve member 29.

The rotor assembly 33 of the present invention includes a one-piece shaft 35 including shaft end portions 37, 39 and an enlarged central cylindrical portion 41 integrally formed with the shaft end portions 37, 39. The wedge portions 25, 27 are formed with a through slot or opening 43 being defined between the opposed substantially flat surfaces 25a, 27a of the wedge portions 25, 27 for accommodating the field core 23 and end winding supports 45, 47 having the prewound field coil 21 mounted thereon. The through slot or opening 43 is generally rectangular when viewed from a direction in which the field coil assembly 66 is inserted into the shaft 35. The cylindrical portion 41 has a diameter D corresponding to a diameter $D_1$ of the outer arcuate portions of the field core 23 such that, upon insertion of the field coil assembly 66 into the through slot 43, the rotor assembly 33 has a substantially cylindrical configuration.

Figure 3:
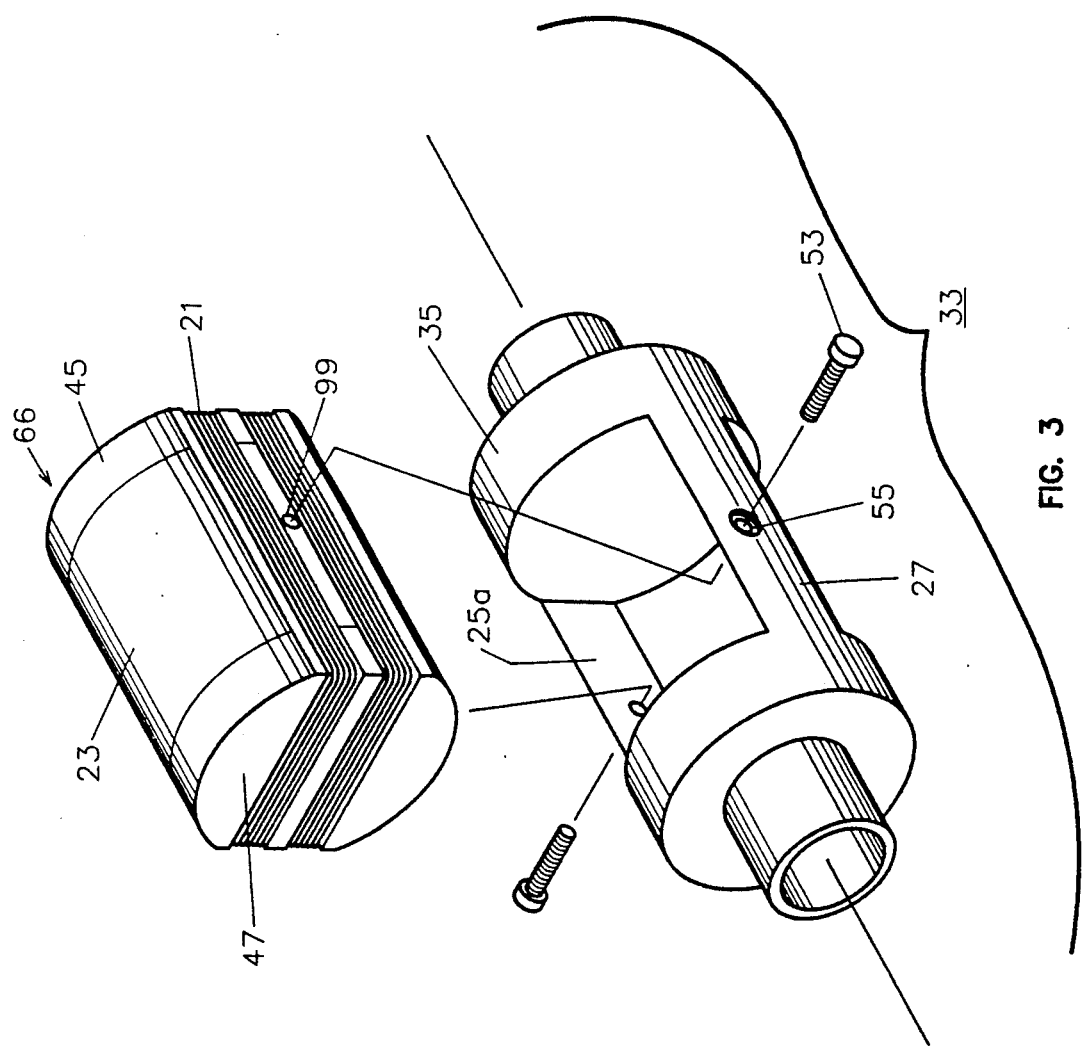
FIG. 3 is an exploded perspective view of the one piece two-pole generator shaft with alternative axial positioning means.

End supports 45, 47 are at respective ends of the field coil assembly 66. One of the end supports 45 or 47 includes block means 49 for terminating coil ends of the field coil 21. The block means 49 may be integrally formed with one or both of the end supports 45 or 47, or provided as a separate element from the end support 45 or 47. After the field coil assembly 66 is inserted into the through slot 43 of the one piece shaft 35, it is axially positioned by an axially directed threaded member 31, accommodated in a threaded bore 51 in the end portion of the shaft 35. Alternatively, as shown in FIG. 3, axial positioning may be achieved by a radially directed threaded member 53 accommodated by a threaded bore 55 in the wedge portion 27 and a threaded bore 99 in core 23.

A sleeve member 29 is then axially slid over the rotor body to form an oil containment can for the rotor assembly 33 by, for example, dipping the assembled rotor body in liquid nitrogen and axially sliding the sleeve member 29 over the rotor body, with the sleeve member 29 being suitably affixed or received in place when the assembled two pole rotor assembly 33 is returned to a normal temperature. In the absence of the axial position described above, the field coil 21 is maintained in the through slot 43 by virtue of the sleeve member 29 positioned on the rotor body. Upon rotation of the rotor body, the shaft wedge portions 25, 27 function to maintain the field coil 21 in place under the rotational "G" field.

This is best accomplished by a sleeve 29 of a non-metallic composite construction of a high strength fiber and high temperature resin, such as disclosed in U.S. Pat. No. 5,122,704. The materials and fiber wind configuration can be designed so as to yield a hoop coefficient of thermal expansion which permits the easy installation and removal described above and a diametral high interference fit in the rotor operation temperature range. This high interference fit between the sleeve 29 and the shaft 35 and core 23 helps to minimize the amount of additional radial retention required in the shaft wedge portions 25, 27 and the amount of additional axial retention of the core 23 that may be required.

The non-metallic sleeve 29 also reduces the eddy-current losses in the sleeve. This reduction in losses in the sleeve yields a reduction in the sizes of the rotor components, such as the core 23, wedges 25, 27, and the sleeve 29, and the overall rotor assembly and the generator assembly.

By virtue of the provision of the through slot 43 in the one-piece shaft 35, assembly of the rotor assembly 33 is facilitated because the field coil assembly 66 can be radially inserted into the one-piece shaft 35 and the sleeve member 29 may be axially placed over the thus assembled components thereby greatly simplifying the overall assembly of the rotor assembly 33. Moreover, if service or maintenance is subsequently required, the entire rotor body may again be dipped in liquid nitrogen so as to enable removal of the sleeve member 29. Additionally, the one piece construction of the shaft for the two pole rotor assembly 33 eliminates the need for regrinding of the bearing races to ensure concentricity.

While we have shown and described specific embodiments in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A two-pole generator rotor assembly comprising a prewound field coil assembly and a shaft means mounting the prewound field coil assembly, said shaft means including a pair of axially spaced shaft end portions and a substantially cylindrical portion integrally formed with said spaced shaft end portions and interposed therebetween so as to form a one-piece shaft, said substantially cylindrical central portion having a through-slot means for accommodating the prewound field coil assembly therein, said through-slot means including a pair of opposed wall portions adapted to engage an outer peripheral portion of the prewound field coil assembly.

2. A two-pole generator rotor assembly according to claim 1, including means for axially positioning the prewound field coil assembly within said through-slot means.

3. A two-pole generator rotor assembly according to claim 2, wherein said means for axially positioning said prewound field coil assembly within said through-slot means are provided by axially directed restraining means in one of said shaft end portions.

4. A two-pole generator rotor assembly according to claim 3, wherein said axially directed restraining means includes an axially directed threaded bore in at least one of said shaft end portions and a threaded member.

5. A two-pole generator rotor assembly according to claim 4, wherein said at least one threaded member is a set screw.

6. A two-pole generator rotor assembly according to claim 3, wherein said pair of opposed wall portions are substantially flat.

7. A two-pole generator rotor assembly according to claim 6, wherein the outer peripheral portion of the field coil assembly is substantially flat.

8. A two-pole generator rotor assembly according to claim 7, Wherein said through-slot means has a substantially rectangular configuration when viewed in an insertion direction of the field coil assembly into the through-slot means.

9. A two-pole generator rotor assembly according to claim 8, wherein the field coil assembly includes support means for supporting a prewound field coil, and wherein the substantially cylindrical portion has a diameter corresponding to a diameter of arcuate peripheral portions of the support means such that when the field coil assembly is inserted into the through slot means, the rotor assembly has a substantially cylindrical outer periphery.

10. A two-pole generator rotor assembly according to claim 9, including a sleeve axially slidable over the rotor assembly when the rotor assembly is exposed to low temperatures and secured in place during normal ambient temperature.

11. A two-pole generator rotor assembly according to claim 10, wherein said sleeve is made of a non-metallic, composite construction.

12. A two-pole generator rotor assembly according to claim 2, wherein said means for axially positioning said prewound field coil assembly within said through-slot means are provided by radially directed fastening means in one of said wedge portions.

13. A two-pole generator rotor assembly according to claim 12, wherein said radially directed fastening means includes a radially directed threaded bore in at least one of said opposed wall portions and a threaded member.

14. A two-pole generator rotor assembly according to claim 1, wherein said pair of opposed wall portions are substantially flat.

15. A two-pole generator rotor assembly according to claim 1, wherein the outer peripheral portion of the field coil assembly is substantially flat.

16. A two-pole generator rotor assembly according to claim 1, wherein said through slot means has a substantially rectangular configuration when viewed in an insertion direction of the field coil assembly into the through slot means.

17. A two-pole generator rotor assembly according to claim 1, wherein the field coil assembly includes a support means for supporting a prewound field coil, and wherein the substantially cylindrical portion has a diameter corresponding to a diameter of arcuate peripheral portions of the support means such that when the field coil assembly is inserted into the through slot means, the rotor assembly has a substantially cylindrical outer periphery.

18. A two-pole generator rotor assembly according to claim 1, further comprising a sleeve axially slidable over the generator rotor assembly for forming an oil containment.

19. A two-pole generator rotor assembly according to claim 18, wherein said sleeve is made of a non-metallic, composite construction.

* * * * *